United States Patent
Zobel

(10) Patent No.: US 6,454,553 B1
(45) Date of Patent: Sep. 24, 2002

(54) APPARATUS FOR PRODUCING MOLDINGS FROM EXPANDABLE PLASTIC PARTICLES

(75) Inventor: Kurt Zobel, Rheinsheim (DE)

(73) Assignee: Schaumaplast Sachsen GmbH (DE)

( * ) Notice: Subject to any disclaimer, the term of this patent is extended or adjusted under 35 U.S.C. 154(b) by 0 days.

(21) Appl. No.: 09/566,108

(22) Filed: May 5, 2000

(30) Foreign Application Priority Data

May 7, 1999 (DE) .......................... 199 21 673

(51) Int. Cl.[7] .............................................. B29C 44/58
(52) U.S. Cl. ..................... 425/4 R; 425/86; 425/817 R
(58) Field of Search ........................ 425/4 R, 86, 817 R

(56) References Cited

U.S. PATENT DOCUMENTS

| | | | | |
|---|---|---|---|---|
| 2,954,589 A | * | 10/1960 | Brown | 264/45.4 |
| 3,156,015 A | * | 11/1964 | Harrison | 425/4 R |
| 3,253,064 A | * | 5/1966 | Buonaiuto | 264/45.4 |
| 3,273,873 A | * | 9/1966 | Stanchel | 425/4 R |
| 3,452,124 A | * | 6/1969 | Knapp | 425/4 R |
| 3,704,081 A | * | 11/1972 | Immel | 425/4 R |
| 3,801,244 A | * | 4/1974 | Eisenberg | 264/45.4 |
| 3,837,769 A | * | 9/1974 | Erlenbach | 425/4 R |
| 3,963,816 A | * | 6/1976 | Smith | 264/53 |
| 4,233,006 A | * | 11/1980 | Panas | 425/4 R |
| 4,327,045 A | * | 4/1982 | Nishikawa et al. | 425/4 R |
| 5,037,592 A | * | 8/1991 | Erlenbach | 264/51 |

FOREIGN PATENT DOCUMENTS

| | | | |
|---|---|---|---|
| DE | 2011270 | 3/1970 | |
| DE | 3836875 | 10/1989 | |
| FR | 2449518 | * 10/1980 | ................. 425/4 R |
| JP | 55-109632 | * 8/1980 | ................. 425/4 R |
| JP | 55-128438 | * 10/1980 | ................. 425/4 R |
| JP | 56-159130 | * 12/1981 | ................. 425/4 R |
| JP | 56-162622 | * 12/1981 | ................. 425/4 R |
| JP | 2-8028 | * 1/1990 | ................. 425/4 R |
| JP | 2-155635 | * 6/1990 | ................. 425/4 R |

OTHER PUBLICATIONS

Gellert, R., "Schäumbares Polystyrol (EPS)", *Kunststoffe*, 77, 977–981, (1987).

* cited by examiner

*Primary Examiner*—Allan R. Kuhns
(74) *Attorney, Agent, or Firm*—Leydig, Voit & Mayer, Ltd.

(57) ABSTRACT

The invention relates to an apparatus and a process for producing moldings from expandable plastic particles, it being favorable for already pre-expanded plastic particles to be used. The invention is intended to propose possible ways of reducing the energy and water consumption. According to the invention, for this purpose the inside walling of a steam chamber is provided with a thermal insulation or a corresponding heat-insulating material is used as the chamber walling and, furthermore, ultrafine spraying heads are arranged on the rear-wall plates for cooling the mold and molding. The ultrafine spraying heads may also be led into the steam chamber through steam-chamber frames.

11 Claims, 2 Drawing Sheets

APPARATUS FOR PRODUCING MOLDINGS FROM EXPANDABLE PLASTIC PARTICLES

The invention relates to an apparatus and a process for producing moldings from expandable plastic particles, it being favorable for already pre-expanded plastic particles to be used.

Such plastic particles are introduced by means of a central filling device into a mold, the inner contour of which corresponds to the molding to be produced and, after introduction, both the mold and, through openings in the mold, the plastic particles contained in the mold are heated by means of steam, and said particles expand and fuse with one another, so that a relatively lightweight molding is formed. To remove the molding produced in this way, without damaging it, from the mold formed generally by at least two parts, a reduction in the foaming pressure of the expanded and fused material of the molding is required by means of cooling. Before this cooling, a pressure reduction is often also carried out in a steam chamber enclosing the mold, in order to extract residual steam both from the steam chamber and from the mold, and as a consequence also from the molding. At the same time, residual gases formed during expansion are of course also drawn off.

Normally used for the cooling during this stabilizing phase is a large volume of water, which is sprayed or jetted onto the outside wall of the mold.

If, as a result of this cooling, stabilizing of the molded part is achieved, the mold can be opened and the molded part can be demolded, whereupon a new production cycle can be carried out for a corresponding molding.

As a result of the energy-intensive production process, caused by the constant heating up and cooling of the steam chamber, intermediate frames and molds, the production costs due to energy and water consumption are correspondingly high. Furthermore, the heating for expanding and fusing as well as the cooling during the stabilizing phase require corresponding times, which cannot be reduced below certain limits owing to physical constraints.

In the past, therefore, various efforts have been made to achieve a cost reduction by reducing the energy and water consumption required, while at the same time retaining or even reducing as far as possible the cycle times required.

For instance, DE 38 36 875 A1 discloses a process and an apparatus for producing such moldings from expandable plastic particles. It is proposed there that condensate occurring during steam treatment be collected and returned to the process. In this case, the condensate is to be injected or sprayed into the steam chamber at relatively high temperatures, at least in the proximity of the pressure-dependent boiling temperature, so that the desired cooling effect is to be achieved virtually exclusively by extraction of the required heat of evaporation.

According to the teaching described there, hot steam is again to be used for the corresponding heating up of the returned condensate and for the spraying in or injection, but, since the residual steam occurring in the process may be contaminated by plastic particles, it is not readily suitable for this and it is essentially additional hot steam that is consumed, so that the energy balance is correspondingly influenced in an adverse way.

The conventional apparatuses for producing corresponding molded parts not only use molds made from metallic materials, such as aluminum or aluminum alloys for example; the steam chambers and intermediate frames in which the molds for producing the molded parts are accommodated likewise consist of metallic materials, so that high heat losses occur as a result of the relatively good thermal conductivity. Furthermore, during steam treatment a relatively large amount of condensate is also precipitated on the inside walling of the steam chamber.

In the subsequent cooling phase, steam chambers, intermediate frames and the mold are accordingly cooled down, so that this entire mass has to be heated again in the subsequent production cycle by being subjected to fresh saturated steam. Additional energy is of course required for this purpose.

Since the conventional steam chambers are designed with corresponding intermediate frames for a wide variety of mold configurations, i.e. a wide variety of molding dimensions, the design generally being based on the molds of the largest dimensions, when correspondingly smaller molds are used there is a correspondingly large dead volume in the space inside the steam chamber, which however has to be included in the heating and cooling processes and, accordingly, correspondingly more energy is required, since the correspondingly greater volume is taken into account in the pressure reduction and a greater volumetric flow of gas accordingly also has to be drawn off from the steam chamber. Since the corresponding pressure reduction is often carried out by means of vacuum pumps, these have to be dimensioned to a corresponding size with respect to their performance parameters.

On this basis, it is therefore the object of the invention to propose an apparatus and a process with which the energy and water consumption required for the production of moldings from expandable plastic particles can be reduced.

This object is preferably achieved by the characterizing features of an apparatus and a process according to the invention. Advantageous embodiments and further developments of the invention will be apparent from the description of the invention provided herein.

In this case, the solution according to the invention is based on conventional possibilities. For instance, conventional molds, which comprise at least two parts, are used, so that demolding of the molding is readily possible when the mold is opened.

The filling of a closed mold may take place via a central filling means, which is in connection with the cavity in the mold, if appropriate with pressure or negative-pressure assistance. Following filling of the mold, excess plastic particles can be removed again from the injectors by applying a negative pressure or by blowing back with positive pressure.

Following filling, steam is introduced into the steam chamber, it being possible for the steam also to enter the interior of the mold, and accordingly also reach the plastic particles directly, through suitable openings in the mold. As a result, both the mold and the plastic particles contained in the mold are heated, so that said particles expand and "fuse" with one another, so that a molding corresponding to the inner contour of the mold is formed.

After ending the steam cycle and the pressure reduction, a stabilization of the molding produced is carried out by cooling. In this case, it is favorable to work with a pressure below ambient pressure, the pressure reduction only being able to commence after the beginning of cooling. The cooling is carried out by spraying water into the steam chamber.

Used for this are ultrafine spraying heads, through which temperature-controlled water is sprayed in an atomized form onto the surface of the mold. For this purpose, the temperature of the water is controlled in a temperature range between 40 and 80° C., it actually being possible to work in the entire designated temperature range. However, it is required to control the temperature to a specific temperature within this temperature range in order to ensure reproducible production conditions. This temperature range is particularly favorable, since condensate occurring from the steam chamber can be collected, cleaned and returned into the steam chamber for renewed cooling. However, this condensate precipitates at corresponding temperatures, so that there is no need for additional heating, as was required according to the prior art referred to in the introductory part of the description, and the waste heat immanent in the process can be utilized to the greatest extent. For controlling the temperature of the condensate to be returned, it is possible if need be to use residual steam which has been sucked out of the steam chamber, passed through a heat exchanger and subjected to corresponding control, so that no additional energy is required for this either.

The chosen temperature of the water mist sprayed in has the effect that the cooling for stabilization takes place to some extent by heat conduction, in other words absorption of thermal energy of the initially cooler water from the mold, and, when the boiling temperature is reached, by extraction of the corresponding heat of evaporation. In this case, the corresponding temperature range, starting from the spraying-in temperature through to the boiling temperature, can be passed through relatively quickly, since the corresponding difference in temperature is relatively small. The sprayed-in, correspondingly temperature-controlled water is advantageously sprayed in an ultrafinely distributed form onto the surface of the mold, so that as far as possible a uniform water mist is formed on the surface of the mold. For this purpose, a plurality of ultrafine spraying heads may be arranged correspondingly in a steam chamber. Since, as already mentioned, different mold configurations, both in their size and in their outer contours, can be introduced into a corresponding steam chamber, it is necessary by means of valves arranged in feed lines to control the respective volumetric flow of cooling water for the different ultrafine spraying heads. For instance, different volumetric flows, if appropriate also at different pressures, may be passed to the different ultrafine spraying heads, so that the cooling of the mold can be influenced in a locally targeted manner. It is consequently possible, for example, for parts of the mold in which there are large accumulations of material for mold-related reasons to be cooled correspondingly more intensely than, for example, thin-walled regions of the mold. This may be taken to the extent that individual ultrafine spraying heads for the cooling of specific molds remain switched off and only just a few ultrafine spraying heads are used, so that the water consumption can be minimized molding-specifically and accordingly also mold-specifically.

For reducing the water demand and ensuring the stabilization of the expanded molding in as short a time as possible, it is favorable to spray water exclusively onto the outside walling of the mold.

Since, according to the invention, the inside walling of the steam chambers or rear-wall plates may be provided with a thermal insulation made of a heat-insulating material, or the walls of the steam chamber and the rear-wall plates may consist of such a heat-insulating material, the heat losses owing to heat radiation via the steam chamber walls or rear-wall plates are reduced and, furthermore, the amount of condensate formed on the inside walling of the steam chamber can be reduced, so that the cooling water mist sprayed in can also be used more effectively and, accordingly, the water consumption can also be reduced considerably.

Materials of ceramic or plastic may be used favorably for such a thermal insulation. If only an insulation of such a heat-insulating material arranged on the inside is used, applied for example on a metallic wall material, this heat-insulating material should be arranged and fastened in such a way that heat bridges are avoided as far as possible. The required supply lines for the cooling water may be integrated at least partially in this heat-insulating material or be insulated with the aid of this material. It may be favorable for at least the parts of the ultrafine praying heads arranged in the interior of the steam chamber to be formed at least partially from a corresponding material of low thermal conductivity or for a corresponding covering to be used. The heat-insulating materials should not exceed a thermal conductivity of 0.5 W/mK, preferably have a k value of 0.25 W/mK and below.

To achieve the already mentioned fine spraying of the cooling water mist sprayed into the steam chamber, the ultrafine spraying heads should have as high a number of bores as possible, the diameter of which should be below 1 mm, preferably around 0.8 mm.

Additional swirling elements may be integrated and the outlets may be of a funnel-shaped design, in which case their funnel-shaped widening should have a diameter of about 1.5 mm. This leads to a fine atomizing of the cooling water sprayed in, which may assist a uniform distribution of the sprayed-in cooling water on the surface of the mold.

Furthermore, the ultrafine spraying heads are designed in number, direction and dimensioning in such a way that all the mold-specific formations can be optimally sprayed.

The apparatus according to the invention may also be advantageously developed by at least one wall of the steam chamber being of a displaceable design, so that the steam chamber volume can be increased or reduced in a way corresponding to the set position of one or more walls. As a result, optimum adaptation to the respective mold size can be carried out by minimizing the dead volume. For instance, a virtually constant distance between the mold surface and the ultrafine spraying heads can be maintained and, furthermore, a virtually constant volume has to be heated, cooled and evacuated, so that the additional components required for this can be designed on the basis of a narrower range than was previously the case, and they can be operated more efficiently.

The displacement of the steam chamber wall or steam chamber walls may, depending on the embodiment, be both a stepless displacement and a displacement stepped at predeterminable intervals, for example using toothed racks. It is also possible of course for the displacement of the steam chamber walls to be carried out with a drive, in which case a linear drive may be used for the translational displacement. If two opposite steam chamber walls are designed to be displaceable, there should be the possibility of realizing different displacement paths, so that even unsymmetrically formed molds can be readily used in such a steam chamber and the dead volume can be minimized virtually completely in this case as well.

A displacement may also take place, however, to reduce the steam chamber volume and thus utilize the corresponding pressure increase for demolding the moldings from the mold.

Since a pressure which lies below ambient pressure, i.e. outside the steam chamber, is to be set in the steam chamber over certain periods of time during the production cycle of a molding, a corresponding amount of energy is required for this. This can be reduced by increasing the steam chamber volume by corresponding displacement of the one or more steam chamber wall or walls. Depending on the corresponding steam chamber volume and required pressure reduction, this alone may suffice to realize the desired pressure reduction in the interior of the steam chamber. At least, however, the device producing the corresponding negative pressure, in other words a correspondingly designed vacuum pump, can be dimensioned to a smaller size.

A further major advantage of this solution according to the invention in comparison with the current state of the art can be achieved by reducing the dead volume in the steam chamber if the steam chamber wall or the steam chamber walls are made to be translationally displaceable and not, as represented in FIG. 1, by means of separate steam chamber intermediate frames which are of a rigid design, adjusting relatively little to the outer dimensions of the mold for reducing the dead volume in the steam chamber, and thus cannot be adapted. The translational displaceability of the steam chamber wall or steam chamber walls results in a significant reduction in effort when changing molds in comparison with the changing of molds with a mold-specific steam chamber intermediate frame.

For the case of translational displacement of the steam chamber wall or steam chamber walls, it may be expedient not to connect the ultrafine spraying heads which are arranged on these displaceable walls rigidly to these walls, but to lead them from outside into the interior of the steam chamber, for which correspondingly suitable sealing elements should be used on the cooling water feed lines to the ultrafine spraying heads and/or in the bushing of the chamber walling, in order to avoid any escape of steam. Such an embodiment ensures that the distance between the ultrafine spraying head and the surface of the mold can be kept constant even when there is a displacement of these walls during the cooling and stabilizing process.

During the cooling and stabilizing phase, a pressure below the ambient pressure of 0.5 to 0.8 bar should be set under the given conditions, i.e. when using cooling water in the temperature range already designated above, in order on the one hand to lower the boiling temperature correspondingly and on the other hand to draw off further residual moisture and residual gases from the mold and molding.

With the solution according to the invention for producing moldings from expanded plastic, the energy and water demand required for production can be greatly reduced in a consistent form and the cycle time required for the production of a molding can likewise be reduced considerably. This process has the consequence that the molding has a lower residual moisture content.

The invention is to be explained in more detail below by way of example.

DETAILED DESCRIPTION OF THE INVENTION

Figure 1:
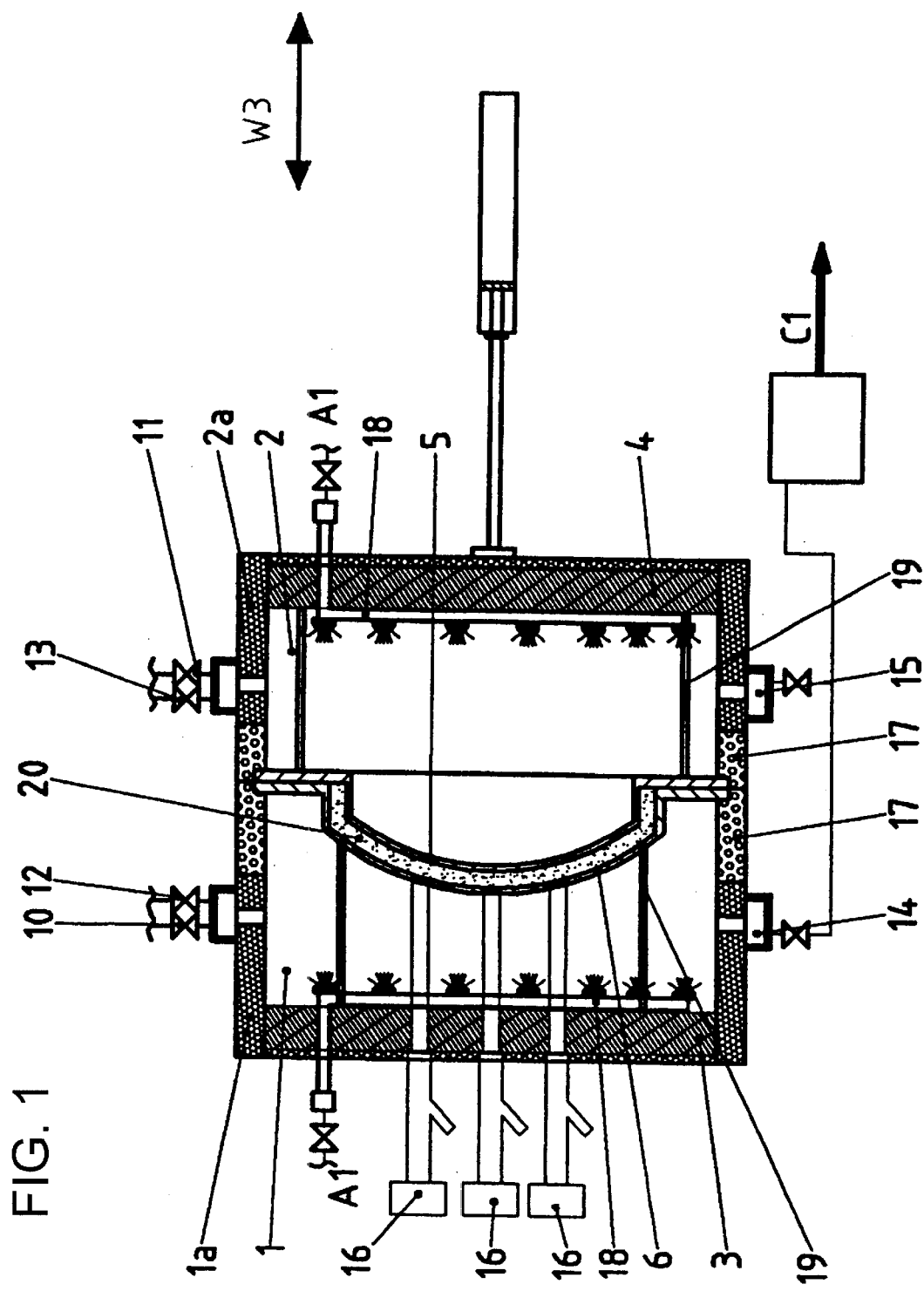
FIG. 1 shows an example of an apparatus for producing moldings from expandable plastic particles, in a schematic representation.
Figure 2:
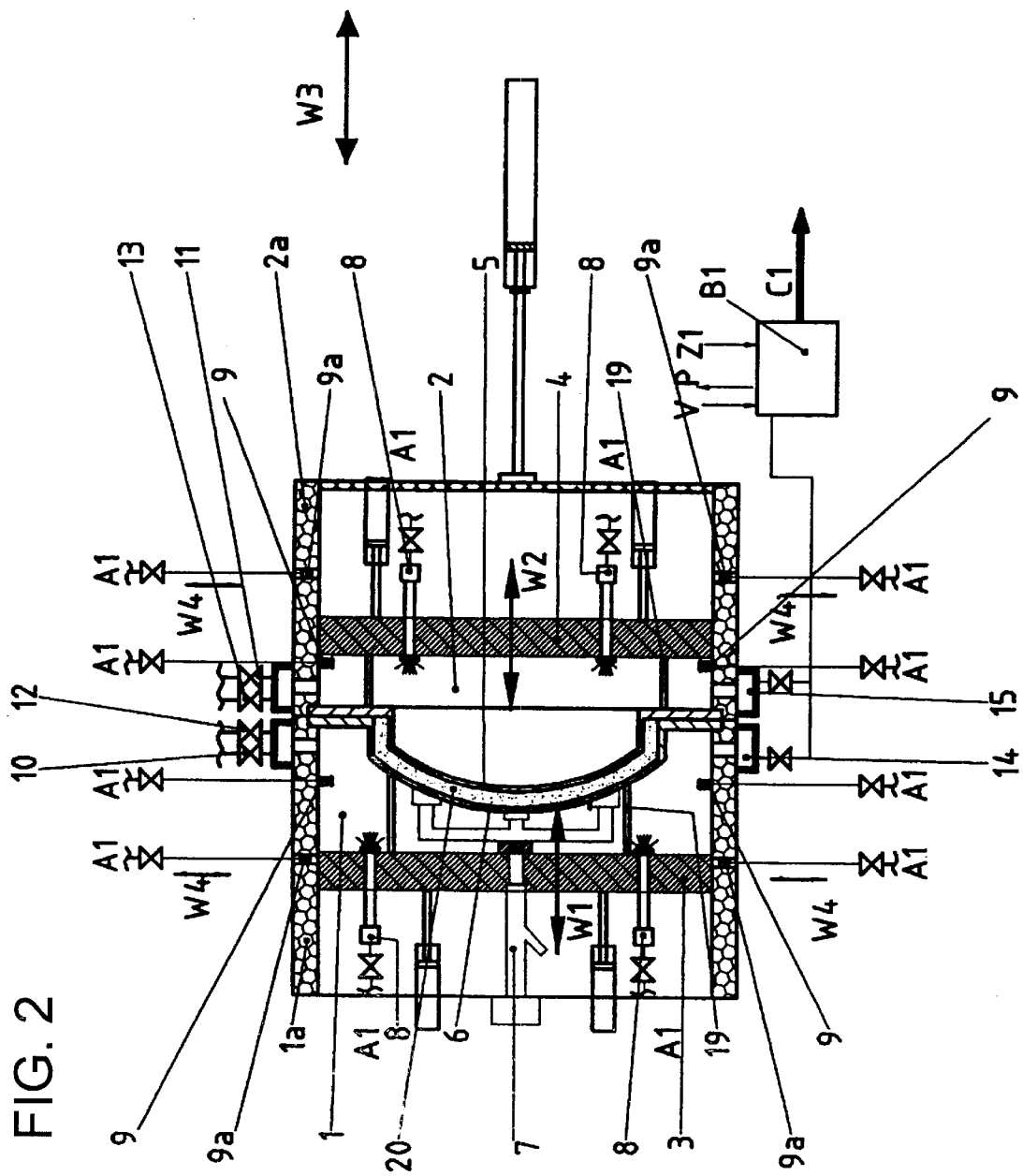
FIG. 2 shows a further example of an apparatus for producing moldings from expandable plastic particles, in a schematic representation.

In the case of the example shown in FIG. 2 of an apparatus according to the invention, a mold 5, 6 formed by two parts is accommodated in the steam chambers 1, 2. In this example, the parts of the mold 5, 6 are rigidly connected respectively to one of the two steam-chamber frames 1a or 2a. The steam chamber 2 can, as indicated by the hydraulic cylinder and the double-headed arrow W3, be moved back and forth along an axis, so that the steam chambers and accordingly also the mold 5, 6 can be opened and closed again. The closed position is represented in FIGS. 1 and 2.

The left-hand part 6 of the mold here in FIG. 2 is connected to a central filling device 7 as the filling device, through which the interior of the mold can be filled with pre-expanded plastic particles. With a central filling device, there is a significant reduction in the steam chamber seals for individual fillers.

In FIG. 1, three fillers (16) are represented, while in the case of the apparatus according to the invention as shown in FIG. 2 there is only one central filling device (7).

The filling may in this case take place advantageously by utilizing corresponding pressure differences, i.e. a negative pressure may be set in the interior of the mold 5, 6 during filling, so that the filling can at least be assisted.

With the connecting piece indicated on the central filling device 7, after adequate filling of the mold 5, 6 it is possible for the feed to be emptied, by applying a corresponding pressure, and accordingly for the excess plastic particles to be removed from the feeds.

After filling the mold 5, 6 and locking the closed mold, steam is introduced into the interior of the steam chamber via the feeds 12 and 13 and heats both the mold 5, 6 and the plastic particles in the interior of the mold 5, 6, corresponding passages (for example orifice or slot nozzles) being present in the mold 5, 6 for heating the plastic particles in the interior of the mold 5, 6. The plastic particles expand and sinter with one another, so that an intimate bonding of the individual plastic particles, and accordingly also a relatively stable molding, can be obtained. For monitoring this process step and also other subsequent process steps, temperature and pressure sensors (not represented here) may be present in the steam chamber and pressure and temperature sensors may likewise be present on the mold 5, 6, the measured values of which sensors can be used for the process control. It is thus possible to proceed, for example, in such a way that, when certain predeterminable pressure and/or temperature values are reached, a signal is passed to a control system (likewise not represented here), which triggers a time cycle control, with which the heating is carried out over a certain molding-specific period of time. Once this time has elapsed, the condensate valves 14 and 15 are opened, so that at least the positive pressure prevailing up to that time in the interior of the steam chamber can be reduced. At this point in time at the latest, the inlets for the saturated steam 12 and 13 are closed.

The pressure reduction in the interior of the steam chamber, which may be assisted by activation of the unit producing negative pressure, already mentioned several times, has the effect that the temperature in the interior of the steam chamber is reduced and the residual steam still existing up to that time is drawn off.

Before the pressure reduction, at the same time or after this, the cooling and stabilizing process may be initiated. For this purpose, a further reduction of the pressure in the interior of the steam chamber may be carried out, with the still remaining residual moisture advantageously being extracted from the molding. Temperature-controlled water is applied by means of the ultrafine spraying heads 8, 9 and 9a to the surface of the mold 5, 6 in a form which is as finely distributed as possible, as a spray mist.

In the example shown here of an apparatus according to the invention, on the opposite rear-wall plates 3 and 4 of the steam chambers there are respectively arranged a plurality of ultrafine spraying heads 8, with which spray mist can be directed onto the surface of the mold 5, 6. Respectively arranged at the upper and lower edges of the walls of the steam chamber are additional ultrafine spraying heads 9, 9a, which direct cooling mist in a targeted manner onto the upper and lower regions of the mold 5, 6 in which there are, as can be clearly seen in FIG. 1, corresponding accumulations of material of the mold 5, 6, in order to extract correspondingly more heat from the mold 5, 6 there, in a targeted manner, and to ensure relatively uniform cooling of the mold, while avoiding major temperature gradients on the mold 5, 6.

At the bottom of the steam-chamber frames 1a and 2a there are outflows 14 and 15, which can be closed with valves and via which deposited condensate can get into a condensate collecting container B 1. The condensate may be stored in the condensate collecting container B 1 and, as already mentioned in the general part of the description, have its temperature controlled correspondingly to the desired temperature, which should favorably lie between 60 and 80° C. The representation of a heat exchanger, present in the condensate collecting container B 1 and on the latter, for this temperature control has been omitted in FIG. 1. For safety reasons, there may be an overflow C 1 on the condensate collecting container B 1.

In FIG. 2 it is indicated that the condensate collecting container B 1 is connected to a pump, which sucks the water out of the condensate collecting container B 1 via the indicated line P and conducts it with a pressure of between 3 and 7 bar via supply lines (not shown) to the ultrafine spraying heads 8, 9 and 9a. In this case there may be correspondingly controllable valves A1, with which it is possible to compensate for pressure fluctuations, in the supply lines to the ultrafine spraying heads 8, 9 and 9a. These valves A1 may also be used to set different pressures and volumetric flows at the individual ultrafine spraying heads 8, 9 and 9a and, if appropriate, to switch off individual ultrafine spraying heads 8, 9 or 9a.

The condensate occurring may, however, also be conducted to a steam generator, in a form not represented, and be vaporized with reduced energy, as a result of the increased condensate temperature, and the steam may be used for expanding and fusing the plastic particles in the steam chamber.

In FIG. 2 it can also be seen that the two parts of the mold 5, 6 are fastened on the two steam-chamber frames 1a and 2a of the steam chamber by means of mold-specific elements. These elements should favorably likewise consist of a heat-insulating material, in order to lower the heat losses correspondingly.

In this example, the two steam-chamber frames 1a and 2a and rear-wall plates 3 and 4 consist of heat-insulating material. A heat-insulating material of a reinforced plastic with a k value of 0.2 W/mK was used here. This thermal insulation has the effect that the amount of condensate which can precipitate on the inside walling of the steam chamber is reduced in comparison with conventional apparatuses. Similarly, the temperature reduction in this region during the cooling and stabilizing phase is less than is the case likewise with customary apparatuses.

In the example shown in FIG. 2, at least the two rear-wall plates 3 and 4 of the steam chamber are translationally movable, as is indicated by the double-headed arrows W1 and W2. Since the two rear-wall plates 3 and 4 can be displaced independently of each other, there is the possibility of adapting the steam chamber volume optimally to the mold 5 and 6 respectively used, so that dead spaces can be avoided to the greatest extent. For this reason, a central filling 7 of the mold is also provided, arranged in such a way that it does not restrict the freedom of movement of the two rear-wall plates 3 and 4.

In this example, the ultrafine spraying heads 8 are led through the rear-wall plates 3 and 4, it being possible for the feeds into the steam chambers 1 and 2 to be at least partially of a flexible design, to be able to compensate for the displacement paths of the rear-wall plates 3 and 4.

The possibility of displacement of the rear-wall plates 3 and 4 also gives rise to the possibility, as already explained in the general part of the description, of having an influence on the internal pressure inside the steam chambers 1 and 2, so that the internal pressure can be increased or reduced in a targeted manner, depending on how this is required in the sequence of the process during the production of the moldings. As a result, it is possible to dispense entirely with the unit producing negative pressure, or a negative-pressure-producing unit dimensioned to a correspondingly smaller size may be required, so that the energy required can be further reduced.

What is claimed is:

1. An apparatus for producing moldings from expandable plastic particles comprising:
   a mold formed by least two parts, wherein the mold comprises rear walls;
   a steam chamber, into which steam can be introduced for expanding and fusing the plastic particles, wherein the mold is accommodated in the steam chamber;
   means of heating at least the molds and means for providing cooling water for reducing the foaming pressure and stabilizing the plastic molding obtained by expanding and fusing;
   ultrafine spraying heads comprising bores with a diameter <1 mm and additional swirling elements which are arranged in the steam chamber in such a way that the rear walls of the mold can be finely sprayed on all sides, water can be fed to the ultrafine spraying heads at a predeterminable pressure by means of a pump, water can be respectively assigned at least to one ultrafine spraying head, and valves are arranged in feed lines.

2. The apparatus as claimed in claim 1, wherein the steam chamber comprises at least one condensate outlet, from which condensate passes to a condensate collecting container, in which there is a temperature-control device, wherein the condensate collecting container is connected to the pump, for returning condensate as cooling water.

3. The apparatus as claimed in claim 1, wherein the outlets of the ultrafine spraying heads are of a funnel-shaped design.

4. The apparatus as claimed in claim 1, wherein the inside walling of the steam chamber is provided with a thermal insulation or the walling of the steam chamber is formed from a heat-insulating material of which the thermal insulation value is <0.5 W/mK.

5. The apparatus as claimed in claim 1, wherein feeds for water to the ultrafine spraying heads are accommodated in the steam-chamber frames or are integrated into the rear-wall plates.

6. The apparatus as claimed in claim 1, wherein at least one wall of the walling of the steam chamber is translationally displaceable with a drive for varying the volume of the steam chamber.

7. The apparatus as claimed in claim 1, wherein the steam chamber is connected to a unit producing a pressure below ambient pressure.

8. The apparatus as claimed in claim 7, wherein the unit producing negative pressure is a vacuum pump.

9. The apparatus as claimed in claim 1, wherein the ultrafine spraying heads are formed at least partially from a material of low thermal conductivity or are covered with such a material, as a thermal insulation.

10. The apparatus a s claimed in claim 1, wherein the ultrafine spraying heads are designed and exchangeable mold-specifically.

11. The apparatus as claimed in claim 1, wherein a central filling device is led into the steam chamber to the mold.

* * * * *